United States Patent
Zhao et al.

(10) Patent No.: US 10,053,921 B2
(45) Date of Patent: Aug. 21, 2018

(54) CONTACT PRESSURE LIMITATION

(71) Applicant: GE Oil & Gas UK Limited, Bristol (GB)

(72) Inventors: Jian Zhao, Newcastle (GB); Andrew Roberts, Newcastle (GB); Upul Fernando, Newcastle (GB)

(73) Assignee: GE OIL & GAS UK LIMITED, Bristol (GB)

( * ) Notice: Subject to any disclaimer, the term of this patent is extended or adjusted under 35 U.S.C. 154(b) by 0 days.

(21) Appl. No.: 15/312,326

(22) PCT Filed: May 1, 2015

(86) PCT No.: PCT/GB2015/051281
§ 371 (c)(1),
(2) Date: Nov. 18, 2016

(87) PCT Pub. No.: WO2015/177503
PCT Pub. Date: Nov. 26, 2015

(65) Prior Publication Data
US 2017/0096861 A1 Apr. 6, 2017

(30) Foreign Application Priority Data

May 23, 2014 (GB) .................................. 1409217.5

(51) Int. Cl.
*E21B 17/01* (2006.01)
*E21B 19/00* (2006.01)

(52) U.S. Cl.
CPC .......... *E21B 17/017* (2013.01); *E21B 19/002* (2013.01)

(58) Field of Classification Search
CPC ............................. E21B 17/017; E21B 19/002
See application file for complete search history.

(56) References Cited

U.S. PATENT DOCUMENTS 6,009,907 A * 1/2000 Secher .................. E21B 17/017
138/109
6,039,083 A 3/2000 Loper
(Continued)

FOREIGN PATENT DOCUMENTS

AU 2005259096 12/2010
CN 1220717 A 6/1999
(Continued)

OTHER PUBLICATIONS

J. A. Clevelario et al. Flexible Riser Outer Sheath Full Scale Wearing Simulation and Evaluation, Offshore Technology Conference, May 4-7, Houston, Texas, 2009.
(Continued)

*Primary Examiner* — James G Sayre
*Assistant Examiner* — Aaron L Lembo
(74) *Attorney, Agent, or Firm* — Knobbe, Martens, Olson & Bear, LLP (57) ABSTRACT

Apparatus and a method are disclosed for limiting contact pressure between a flexible pipe and a bending guide member. The apparatus includes a bending guide member extending over a covered region of a flexible pipe in which the flexible pipe can bend wherein a gap between an inner surface of the bending guide member and an outer surface on the flexible pipe in at least a portion of the covered region is tapered and narrows towards an unconstrained end of the bending guide member.

20 Claims, 5 Drawing Sheets

(56) References Cited

U.S. PATENT DOCUMENTS

| | | | | |
|---|---|---|---|---|
| 8,736,821 B2* | 5/2014 | Smith | ............. | G01B 11/165 |
| | | | | 356/32 |
| 8,869,840 B2* | 10/2014 | Lund | ............. | E21B 17/017 |
| | | | | 138/109 |
| 9,546,751 B2* | 1/2017 | Roberts | ............. | F16L 33/01 |
| 2006/0180228 A1* | 8/2006 | Filho | ............. | F16L 35/00 |
| | | | | 138/153 |
| 2011/0176125 A1* | 7/2011 | Smith | ............. | G01B 11/165 |
| | | | | 356/32 |
| 2012/0241037 A1* | 9/2012 | Lund | ............. | E21B 17/017 |
| | | | | 138/106 |
| 2014/0326461 A1* | 11/2014 | Tan | ............. | E21B 17/015 |
| | | | | 166/350 |
| 2017/0044838 A1* | 2/2017 | Pionetti | ............. | E21B 17/017 |

FOREIGN PATENT DOCUMENTS

| | | |
|---|---|---|
| CN | 101501293 A | 8/2009 |
| CN | 103388457 A | 11/2013 |
| EP | 2503093 | 9/2012 |
| FR | 2871511 | 12/2005 |
| GB | 2203508 | 10/1988 |
| GB | 2286414 | 8/1995 |
| WO | WO 94/09245 | 4/1994 |
| WO | WO 2001/075262 | 10/2001 |
| WO | WO 2009/092933 | 7/2009 |

OTHER PUBLICATIONS

International Search Report and Written Opinion for International Application No. PCT/GB2015/051281 dated Jul. 3, 2015.
International Preliminary Report on Patentability for International Application No. PCT/GB2015/051281 dated Nov. 29, 2016.

* cited by examiner

CONTACT PRESSURE LIMITATION

The present invention relates to an apparatus and method for limiting contact pressure between a flexible pipe or other such elongate object and a bending guide such as a bend stiffener or Bellmouth or the like. In particular, but not exclusively, the present invention relates to the provision of a tapered gap between a bend stiffener and an outer surface on a flexible pipe which helps provide an increased effective contact area and thus a decreased concentration of contact pressure as the bend stiffener and flexible pipe bend.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, pipe body may include polymer and metal layers, or polymer and composite layers, or polymer, metal and composite layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased. Increased depths also increases a length of flexible pipe that is used and thus a weight of pipe that hangs from a topside support structure.

It is noted that flexible pipe may also be used for shallow water applications (for example less than around 500 meters depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However, as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage. Termination and support of the ends of the flexible pipe also provide complex problems.

It is thus known that the termination of flexible pipe body via end fittings is a highly complex and important aspect to the provision of any flexible pipe. Effectively the end fitting and end of the flexible pipe body provide a transition region in which the overall rigidity of the flexible pipe makes a transition from a highly rigid, typically metallic, structure which supports an end of the flexible pipe to the flexible region of the flexible pipe body itself. Conventionally a rigid end fitting is supported upon a framework structure and a bending guide such as a bend stiffener or Bellmouth are used to help ensure that over bending of the flexible pipe does not occur. For example a bend stiffener can be secured to the end fitting and/or the support structure. The bend stiffener itself includes rigid metallic elements at one end which are conventionally referred to as "steel work" and which terminate in a torus like structure. A conventional bend stiffener also includes a typically polymeric body which is relatively thick in width in a region surrounding the steel work and which has an outer tapered surface which terminates in a pointed area which is relatively thin. The flexibility offered by the bend stiffener thus increases towards the tapered end of the bend stiffener where the flexible pipe is unconstrained. The bend stiffener is provided to help provide a transition region between rigid and flexible structures so that in use when motion of the flexible pipe occurs over bending is avoided or at least a risk of over bending is reduced.

Whilst many bend stiffener designs work well in practice it has been found that some conventional bend stiffener profiles result in induced contact pressure concentration between a flexible pipe extending through a bend stiffener and the bend stiffener itself. Contact pressure concentration at various points along the length of the bend stiffener can lead to fatigue failure of the pipe.

It is an aim of the present invention to at least partly mitigate the above-mentioned problems.

It is an aim of certain embodiments of the present invention to provide apparatus and a method for stiffening an end of a flexible pipe using a bend stiffener which entirely avoids or at least substantially reduces the risk of contact pressure concentration between an inner surface of a bend stiffener and an outer surface on a flexible pipe.

It is an aim of certain embodiments of the present invention to help average a distribution of contact pressure along a covered region of a flexible pipe.

It is an aim of certain embodiments of the present invention to extend fatigue life of a flexible pipe by the reduction of maximum contact pressure and maintenance of a minimum bend radius above a predetermined threshold for the flexible pipe.

It is an aim of certain embodiments of the present invention to provide a bend stiffener and/or Bellmouth which can be used to protect and support any type of dynamic riser such as a flexible riser, umbilical, mooring line and cable and to limit bending stresses and minimum curvature radiuses to an acceptable level.

It is an aim of certain embodiments of the present invention to provide a method and apparatus for limiting contact pressure between a flexible elongate member such as a flexible pipe or a cable or an umbilical or a mooring line or the like and a bending guide member such as a bend stiffener or Bellmouth or the like.

According to a first aspect of the present invention there is provided apparatus for limiting contact pressure between a flexible pipe and a bending guide member, comprising:

a bending guide member extending over a covered region of a flexible pipe in which the flexible pipe can bend; wherein a gap between an inner surface of the bending guide member and an outer surface on the flexible pipe in at least a portion of said covered region is tapered and narrows towards an unconstrained end of the bending guide member.

Aptly the tapered gap provides an increased effective contact area between the inner surface of the bending guide member and the outer surface on the flexible pipe.

Aptly the tapered gap is located between a rigid region of the bending guide member and the unconstrained end of the bending guide member.

Aptly the tapered gap is generally smoothly tapered.

Aptly the inner surface and/or outer surface of a part or the whole of said at least a portion of the covered region is a frusto conical shaped surface.

Aptly the inner surface and/or outer surface of a part or the whole of said at least a portion of the covered region is a surface of revolution created by rotating a curve around a central axis of the flexible pipe or bending guide member in an unbent state.

Aptly the tapered gap is located at an axial location along the covered region of the flexible pipe at a position of peak bending curvature.

Aptly the outer surface on the flexible pipe and/or an inner surface of a channel extending through the bending guide member comprises a tapered region.

Aptly the outer surface on the flexible pipe comprises a region of an outer sheath of the flexible pipe wrapped in tape.

Aptly the tape is wrapped around the outer sheath to a greater thickness towards a flexible end of the bending guide member wherein an outer tape surface of the tape windings is tapered and provides the outer surface on the flexible pipe.

Aptly the bending guide member is a Bellmouth.

Aptly the bending guide member is a bend stiffener.

Aptly a wide end of the tapered gap starts to taper towards a narrow end of the tapered gap at an axial location along the covered region proximate to an axial location of a termination point of internal metallic elements of the bend stiffener member.

Aptly the axial location comprises a lowest point of steel work of the bend stiffener.

Aptly the lowest point of steel work comprises a lowest point of a torus ring of the bend stiffener.

Aptly the tapered gap has a width of at least about around 10 mm at a wide end of the gap.

Aptly the width is at least about around 25 mm.

Aptly the width is at least about around 40 mm.

Aptly the tapered gap has a width of less than about around 20 mm at a narrow end of the gap.

Aptly the width is less than about around 10 mm.

Aptly the width is less than about around 5 mm.

Aptly the inner surface of the bend stiffener provides a bore that comprises:

a first substantially cylindrical region having a first diameter proximate to a rigid end of the bend stiffener; and a tapered region extending from the first substantially cylindrical region towards an unconstrained end of the bend stiffener.

Aptly the tapered region extends to an end of the bore at the flexible end of the bend stiffener.

Aptly the tapered region extends to a further substantially cylindrical region having a further diameter that extends towards an end of the bore at the flexible end of the bend stiffener.

According to a second aspect of the present invention there is provided a method for limiting contact pressure between a flexible pipe and a bending guide member, comprising the steps of:

locating a bending guide member over a flexible pipe to provide a covered region of the flexible pipe where the flexible pipe can bend; thereby providing a tapered gap, that narrows towards an unconstrained end of the bending guide member, between an inner surface of the bending guide member and an outer surface on the flexible pipe in at least a portion of the covered region.

Aptly the method further comprises providing the tapered gap at a location between a rigid region of the bending guide member and the unconstrained end of the bending guide member.

Aptly the method further comprises providing the tapered gap at an axial location along the covered region at a position of peak bending curvature.

Aptly the method further comprises providing the tapered gap by wrapping tape around an outer sheath of the flexible pipe.

Aptly the method further comprises wrapping the tape to a tapered thickness around the outer sheath.

Aptly the method further comprises providing the tapered gap by providing a bend stiffener having a bore having an inner surface that includes a first substantially cylindrical region and at least one tapered region that tapers to a narrow diameter at a tapered region end nearest to an unconstrained end of the bend stiffener.

Aptly the method further comprises providing the tapered gap by providing a Bellmouth having a flared inner surface that includes at least one inset tapered region that tapers to a narrow diameter at a tapered region end nearest to an unconstrained end of the Bellmouth.

According to a third aspect of the present invention there is provided apparatus for limiting contact pressure between a flexible elongate member and a bending guide member, comprising:

a bending guide member extending over a covered region of a flexible elongate member where the flexible elongate member bends; wherein a gap between an inner surface of the bending guide member and an outer surface of the flexible elongate member in at least a portion of said covered region is tapered, the taper having a narrow end most proximate to an unconstrained end of the bending guide member.

Aptly the flexible elongate member comprises a flexible pipe or a table or an umbilical or a mooring line or the like.

Aptly the bending guide member comprises a bend stiffener or a Bellmouth or a hang off or an I-tube or ancillary equipment or the like.

Certain embodiments of the present invention enable an internal profile of a bending guide and/or profile of an outer surface on a flexible pipe to be designed and provided so that the two profiles meet closely and cooperate in use so that the contact pressure between the two abutting surfaces can be distributed in a controlled fashion along a length of a covered area of a flexible pipe.

Certain embodiments of the present invention provide a bending guide which can be used to protect and support all types of dynamic elements (for example flexible risers, umbilicals, mooring lines and/or cables or the like). For example the bending guide adds local stiffness to a riser adjacent to a rigid connection point to limit bending stresses and curvature to acceptable levels. In contrast to conventional techniques which provide a substantially cylindrical bore through a bend stiffener and a substantially cylindrical outer surface on a flexible pipe, a gap between an effective outer surface of the pipe and bend stiffener is tapered in at least part of a covered region of the flexible pipe. The tapering helps distribute contact pressure and avoids concentration build-up of contact pressure. Aptly the tapered gap can optionally be provided by providing a tapered region on the inner surface of the bending guide and/or a tapered region on the outside of the dynamic element.

Certain embodiments of the present invention help determine an overall contact area between abutting surfaces of a guide that helps define a minimum bend radius and a bendable element. Increasing a contact area relative to conventional techniques helps reduce or avoid contact pressure concentration which helps avoid failure of the bendable element, such as a flexible pipe or the like or the failure of any other type of elongate member so guided.

Certain embodiments of the present invention introduce one or more tapered regions in a central passageway that extends along a bend stiffener or Bellmouth or the like. The tapered regions help control a contact area between the bending guide and a proximate flexible pipe or other such elongate flexible member.

Certain embodiments of the present invention will now be described hereinafter with reference to the accompanying drawings, in which.

In the drawings like reference numerals refer to like parts.

Figure 1:
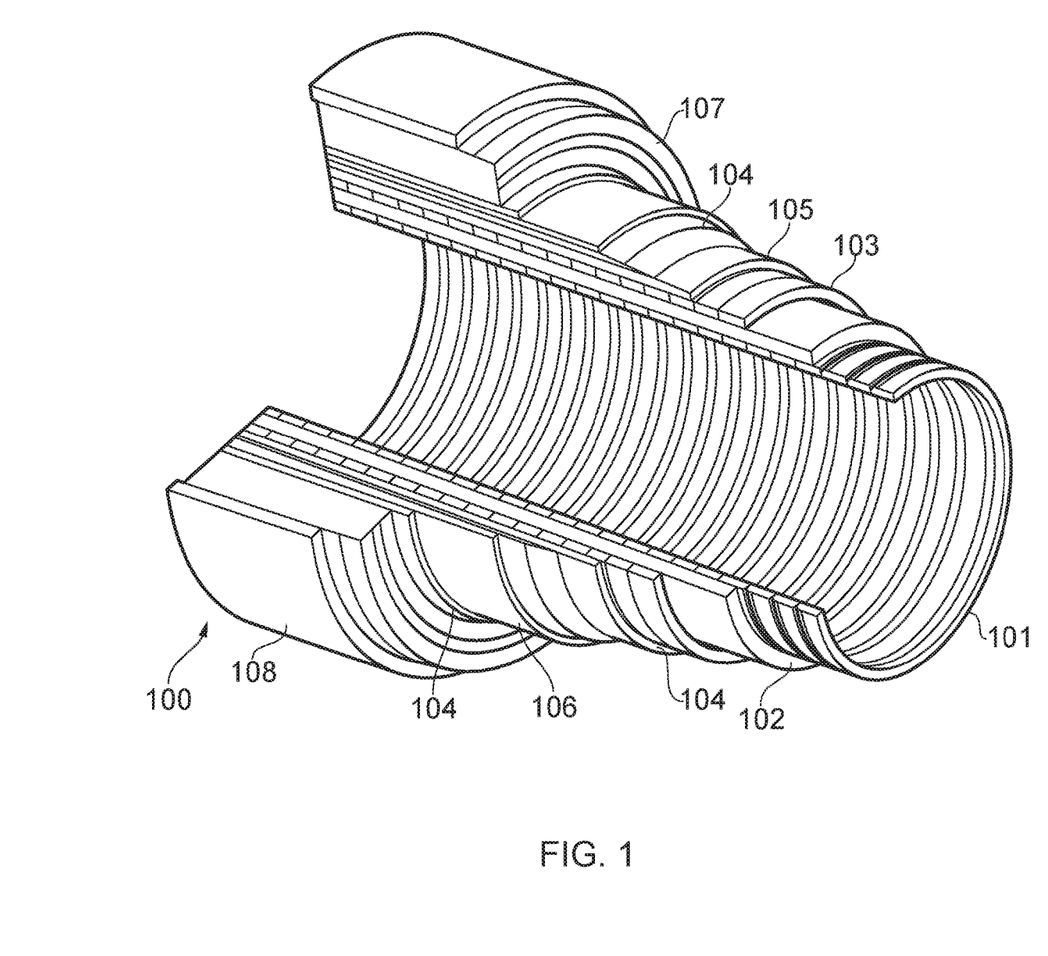
FIG. 1 illustrates flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer illustrated is a metallic layer. Aptly the carcass is formed from stainless steel, carbon steel or the like. The carcass layer may alternatively be formed from composite, polymer, or other materials, or a combination of materials. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a pressure resistant layer that provides a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer illustrated is a metallic layer. Aptly the pressure armour layer is formed from carbon steel, stainless steel or the like. Alternatively the pressure armour layer could be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is formed from a plurality of wires (to impart strength to the layer) that are located over an inner layer and are helically wound along the length of the pipe at a lay angle typically between about 10° to 55°. The tensile armour layers are optionally counter-wound in pairs. The tensile armour layers illustrated are metallic layers. Aptly the tensile armour layers are formed from carbon steel, stainless steel or the like. The tensile armour layers could optionally be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. The end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
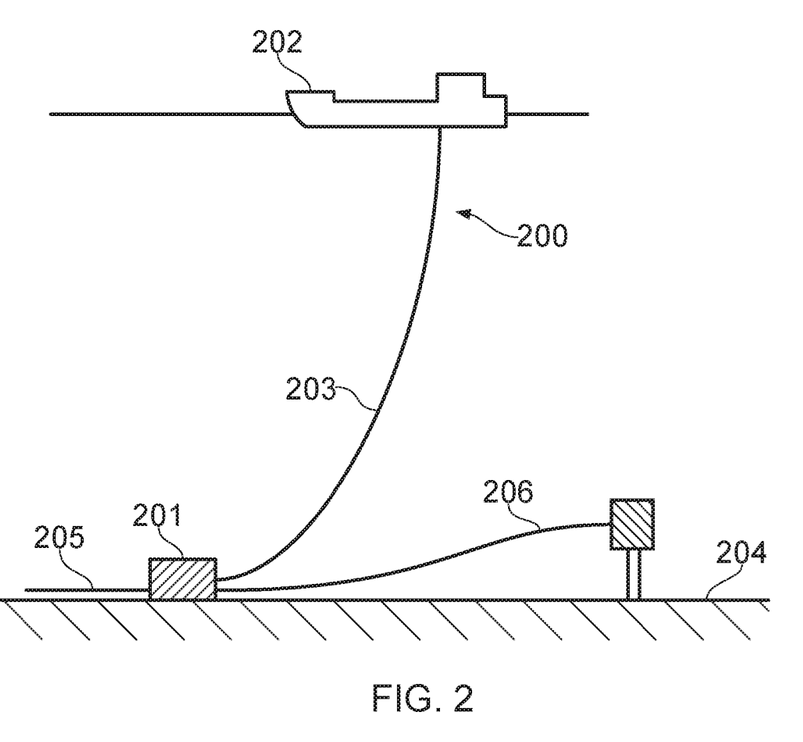
FIG. 2 illustrates use of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line. The flexible flow line 225 comprises a flexible pipe, wholly or in part, resting on the sea floor 224 or buried below the sea floor and used in a static application. The floating facility may be provided by a platform and/or buoy or, as illustrated in FIG. 2, a ship. The riser assembly 200 is provided as a flexible riser, that is to say a flexible pipe 223 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes). FIG. 2 also illustrates how portions of flexible pipe can be utilised as a flow line 225 or jumper 226.

The flexible pipe so described is an example of a flexible elongate member. It will be appreciated that certain embodiments of the present invention are applicable to other types of flexible elongate member such as a cable or an umbilical or a mooring line or the like.

Figure 3:
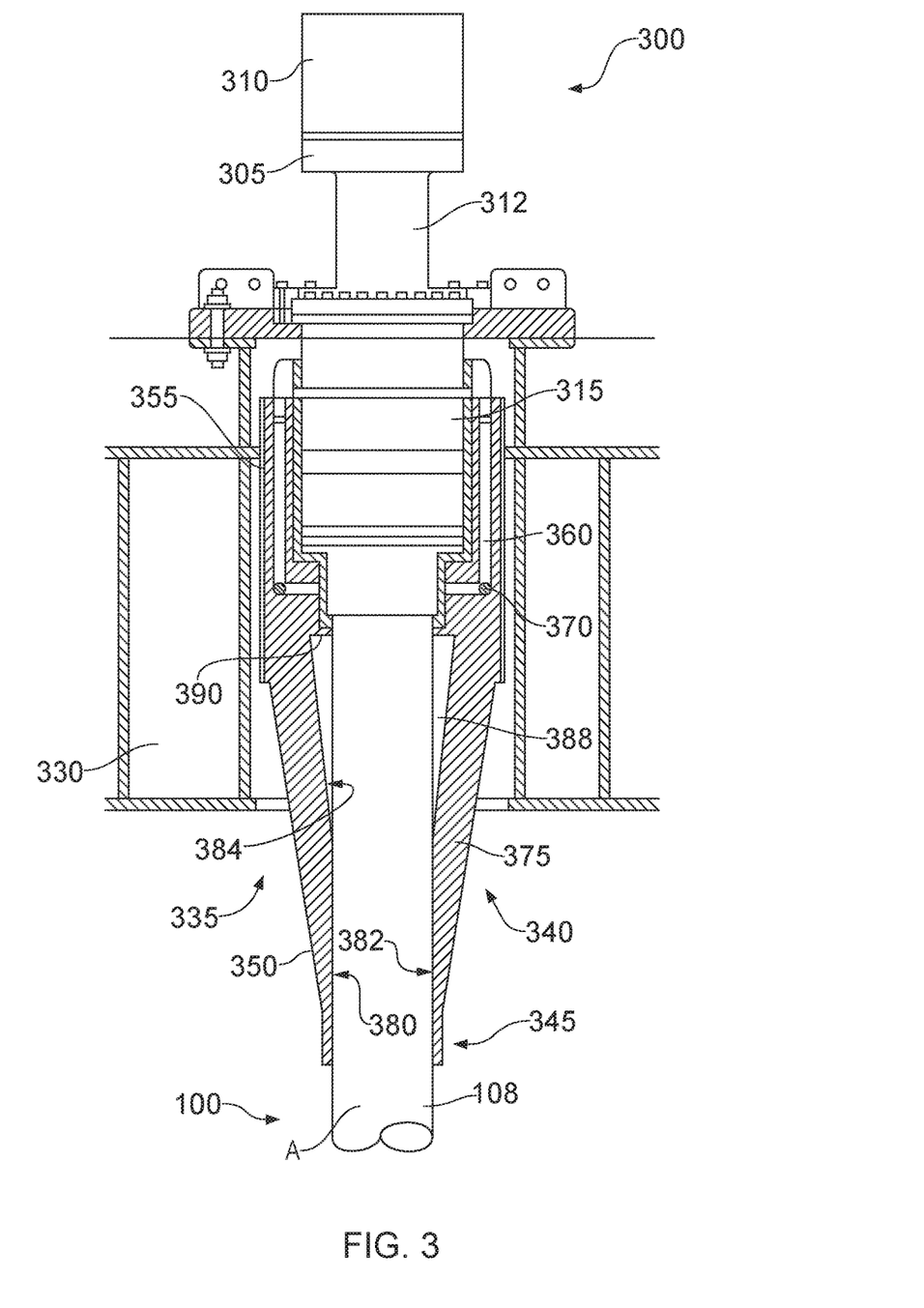
FIG. 3 illustrates a bend stiffener.

FIG. 3 illustrates how flexible pipe body 100 which includes an outer sheath 108 is terminated at a respective end via an end fitting 300. The end fitting 300 is a metallic body which itself terminates in a connecting flange 305 which can be secured to a mating element 310 to continue a pipeline. The end fitting 300 includes a neck 312 extending from the flange to a substantially cylindrical body 315 which includes an end fitting jacket which surrounds terminated layers of the flexible pipe body 100. As illustrated in FIG. 3 the end fitting 300 is secured to a rigid support structure 330 provided by one or more rigid elements such as metal sheet or metal plate or wooden planks or the like. The support structure 330 illustrated in FIG. 3 is part of a platform. A hole 335 is provided in the bottom of the platform through which the flexible pipe body 100 hangs in use.

FIG. 3 also helps illustrate how a bend stiffener 340, which is an example of a bending guide member, is used to cover an outer region of the outer sheath 108 of the flexible pipe. The bend stiffener 340 includes a tapered end 345 which leads immediately into an unconstrained region of the flexible pipe body. That is to say the tapered end 345 of the bend stiffener has little or no effect upon the stiffness and therefore the bending characteristics of the flexible pipe body it covers. This helps form a transition from the degree of stiffness offered by the flexible pipe body into the bend stiffener itself. An outer surface 350 of the bend stiffener is tapered and flares outwardly from the unconstrained end of the bend stiffener towards a wider end 355. The wider end 355 of the bend stiffener is secured via bolts or screws or the like to the platform 330 and includes inner metallic reinforcement 360. This metal reinforcement 360 extends from a rigid end of the bend stiffener towards the unconstrained end and ends in a circular torus 370. The location of the torus 370 defines an end of the "steel work" of the bend stiffener.

The body 375 of the bend stiffener is a polymeric material which surrounds and is reinforced by the steel work at the rigid end of the bend stiffener and thus effectively provides a rigid structure which is secured to the platform 330. Aptly the body of the bend stiffener is manufactured from a polyurethane compound or the like. The polymeric body extends away from the rigid end of the bend stiffener past the point in the axial direction where the torus defines an end of the steel work and extends towards the unconstrained end of the bend stiffener. By virtue of the fact that the outer surface 350 of the bend stiffener is tapered so as to narrow towards the unconstrained end of the bend stiffener and because the polymeric body does not include any rigid elements beyond the torus 370, the degree of flexibility of the bend stiffener increases towards the unconstrained end of the bend stiffener.

As illustrated in FIG. 3 the outer sheath 108 of the flexible pipe body provides a substantially cylindrical outer surface. This extends through the bend stiffener into the rigid end fitting within the jacket. This outer surface is covered by the surrounding bend stiffener. The inner surface 380 provided by the bend stiffener illustrated in FIG. 3 includes a substantially cylindrical inner surface region 382 towards the unconstrained end of the bend stiffener and then a smoothly tapered region 384 which tapers outwardly away from the outer sheath 108 outer surface towards the rigid end of the bend stiffener. A tapered gap 388 is thus located between an inner surface of the bend stiffener which acts as a bending guide member and an outer surface on the flexible pipe (in this example provided by an outer surface of the outer sheath). This tapered gap is provided in a portion of the region of the flexible pipe which is covered by the bend stiffener. The tapered gap 388 is tapered so as to narrow towards the unconstrained end of the bend stiffener. That is to say the gap is wider towards a rigid end of the bend stiffener than towards an unconstrained end of the bending guide member. The tapered gap narrows towards the cylindrical bore provided near the unconstrained end of the bend stiffener where the inner surface of the bend stiffener substantially abuts with the outer surface of the outer sheath 108 so as to support the flexible pipe body as it bends. As illustrated in FIG. 3 the tapered gap 388 is located between a rigid region of the bend stiffener and the unconstrained end of the bend stiffener. In the example shown in FIG. 3 the tapered gap is provided by a tapered inner surface of the bend stiffener which is a frusto conical shaped surface. It will be appreciated that the tapered inner surface could be provided, not as a frusto conical shaped surface, but as a curved surface provided as a surface of revolution created by rotating a curve around a central axis (illustrated by A) when the flexible pipe body is in an un-bent state (as shown in FIG. 3).

The tapered gap 388 illustrated in FIG. 3 is located at an axial location along the covered region of the flexible pipe where a peak bending curvature is expected. The tapered gap helps provide an increased effective contact area between the inner surface of the bend stiffener and the outer surface of the outer sheath when the flexible pipe and the flexible end of the bend stiffener bend.

Aptly although in FIG. 3 the bend stiffener is indicated with an inner bore which opens out into the tapered gap at a starting point 390 which is an abrupt change it will be appreciated that the polymeric body 375 of the bend stiffener can have curved edges and likewise the step in internal diameter of the open bore through the bend stiffener can be more gradual by curving the body. This helps avoid any risk of contact concentration points.

Figure 4:
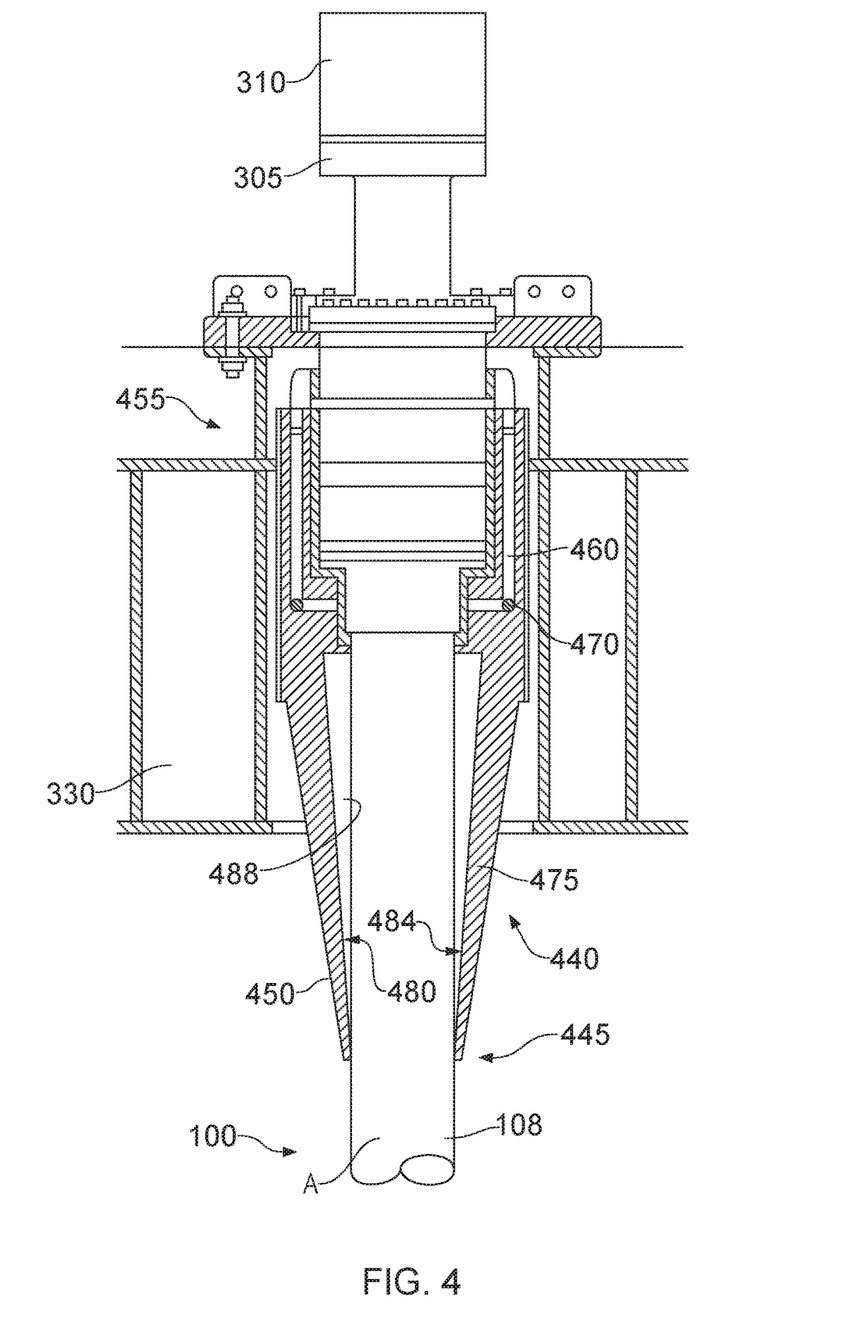
FIG. 4 illustrates a bend stiffener.

FIG. 4 illustrates an alternative bend stiffener supported in a platform and thus illustrates how pipe body 100 which includes an outer sheath 108 is terminated at a respected end via an end fitting 300. The end fitting 300 is a metallic body which itself terminates in a connecting flange 305 which can be secured to a mating element 310 to continue a pipeline. The end fitting 300 includes a neck 315 extending from the flange to a substantially cylindrical body 315 which includes an end fitting jacket which surrounds terminated layers of the flexible pipe body 100. As illustrated in FIG. 4 the end fitting 300 is secured to a rigid support structure 330 provided by one or more rigid elements such as metal sheet or metal plate or wooden plank or the like. The support structure 330 illustrated in FIG. 4 is part of a platform. A hole 335 is provided in the bottom of the platform through which the flexible pipe body 100 hangs in use.

FIG. 4 also helps illustrate how a bend stiffener 440, which is an example of a bending guide member, is used to cover an upper region of the outer sheath 108 of the flexible pipe. The bend stiffener 440 includes a tapered end 445 which leads immediately into an unconstrained region of the flexible pipe body. That is to say the tapered end 445 of the bend stiffener has little or no effect upon the stiffness and therefore the bending characteristics of the flexible pipe body it covers. This helps form a transition from the degree of stiffness offered by the flexible pipe body into the bend stiffener itself. An outer surface 450 of the bend stiffener is tapered and flares outwardly from the unconstrained end of the bend stiffener towards a wider end 455. The wider end 455 of the bend stiffener is secured via bolts or screws or the like to the platform 330 and includes inner metallic reinforcement 460. This metal reinforcement 460 extends from a rigid end of the bend stiffener towards the unconstrained end and ends in a circular torus 470. The location of the torus 470 defines an end of the "steel work" of the bend stiffener.

The body 475 of the bend stiffener is a polymeric material which surrounds and is reinforced by the steel work at the rigid end of the bend stiffener and thus effectively provides a rigid structure which is secured to the platform 330. Aptly the body of the bend stiffener is manufactured from a polyurethane compound or the like. The polymeric body extends away from the rigid end of the bend stiffener past the point in the axial direction where the torus defines an end of the steel work and extends towards the unconstrained end of the bend stiffener. By virtue of the fact that the outer surface 450 of the bend stiffener is tapered so as to narrow towards the unconstrained end of the bend stiffener and because the polymeric body does not include any rigid elements beyond the torus 470, the degree of flexibility of the bend stiffener gradually increases towards the unconstrained end of the bend stiffener.

As illustrated in FIG. 4 the outer sheath 108 of the flexible pipe body provides a substantially cylindrical outer surface. This extends through the bend stiffener into the rigid end fitting within the jacket. This outer surface is covered by the surrounding bend stiffener. The inner surface 480 provided by the bend stiffener 440 includes a smoothly tapered region 484 which tapers outwardly away from the outer sheath 108 outer surface towards the rigid end of the bend stiffener. A tapered gap 488 is thus located between an inner surface of the bend stiffener which acts as a bending guide member and an outer surface on the flexible pipe (in this example provided by an outer substantially cylindrical surface of the outer sheath). This tapered gap is provided in a portion of the region of the flexible pipe which is covered by the bend stiffener. In the bend stiffener illustrated in FIG. 4 the portion is substantially all of the bend stiffener body which extends below the steel work. The tapered gap 488 is tapered so as to narrow towards the unconstrained end of the bend stiffener. That is to say the gap is wider towards a rigid end of the bend stiffener than towards an unconstrained end of the bending guide member. As illustrated in FIG. 4 the tapered gap 488 is located between a rigid region of the bend stiffener and the unconstrained end of the bend stiffener. In the example shown in FIG. 4 the tapered gap is provided by a tapered inner surface of the bend stiffener which is frusto conical shaped. It will be appreciated that the tapered inner surface could be provided, not as a frusto conical shaped surface, but as a curved surface provided as a surface of revolution created by rotating a curve around a central axis (illustrated by A) when the flexible pipe body is in an un-bent state (as shown in FIG. 4).

The tapered gap 488 illustrated in FIG. 4 is located at an axial location along the covered region of the flexible pipe where a peak bending curvature is expected. The tapered gap helps provide an increased effective contact area between the inner surface of the bend stiffener and the outer surface of the outer sheath when the flexible pipe and the flexible end of the bend stiffener bend. Aptly the widest part of the tapered recess is located proximate to the stiffened section of the bend stiffener body.

Whilst certain embodiments of the present invention have been described with respect to FIGS. 3 and 4 in which a bend stiffener includes a single tapered gap it will be appreciated that certain other embodiments of the present invention can utilise one, two, three or more similarly tapered regions with more tapered regions being used for stiffer structures.

Figure 5:
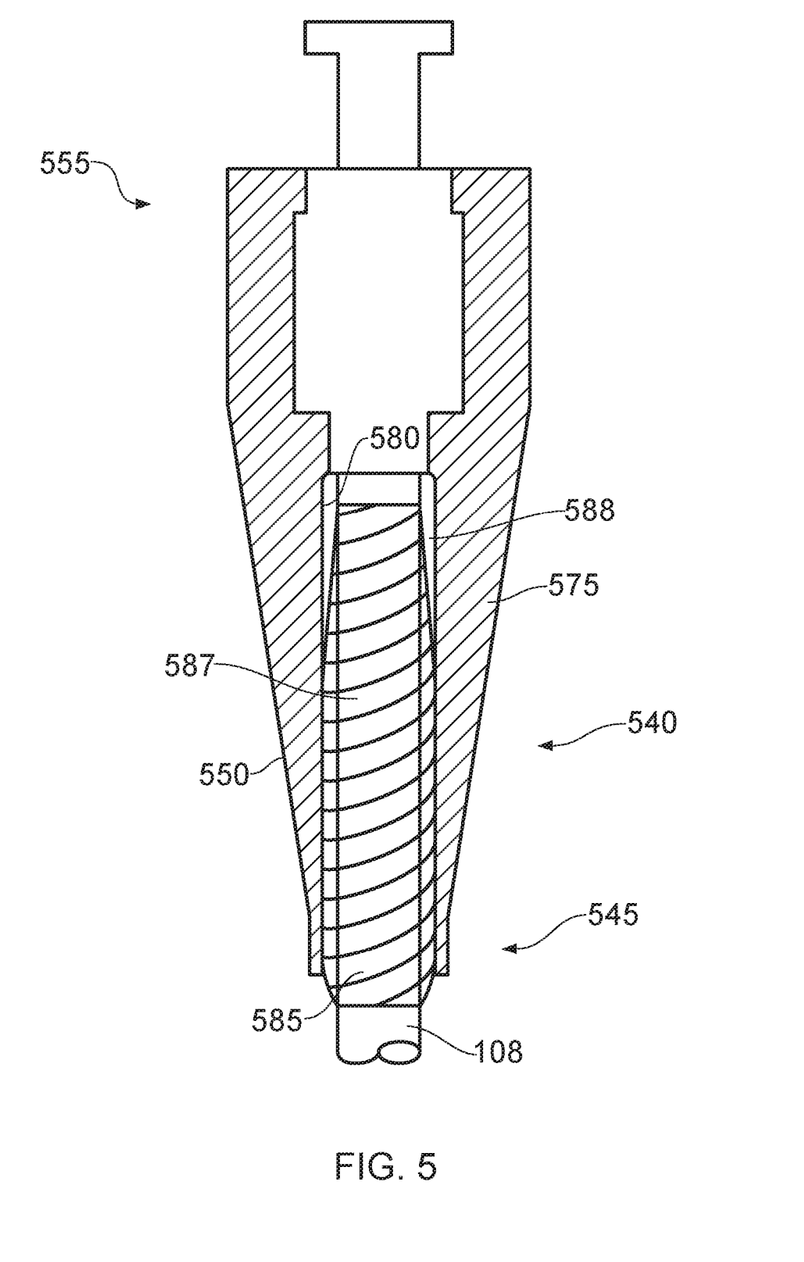
FIG. 5 illustrates a bend stiffener.

FIG. 5 helps illustrate an alternative bend stiffener 540. This is of a type which can be supported on a platform or other rigid structure as per the previous two described bend stiffeners. The steel work illustrated in FIGS. 3 and 4 is not shown in FIG. 5 for the sake of clarity. The bend stiffener is an example of a bending guide member which can be used to cover an outer region on a flexible pipe. The bend stiffener 540 includes a tapered end 545 which leads immediately into an unconstrained region of the flexible pipe body. That is to say the tapered end 545 of the bend stiffener has little or no effect upon the stiffness and therefore the bending characteristics of the flexible pipe body it covers. This helps form a transition from the degree of stiffness offered by the flexible pipe body into the bend stiffener itself. An outer surface 550 of the bend stiffener is tapered and flares outwardly from the unconstrained end of the bend stiffener towards a wider end 555. The wider end 555 of the bend stiffener can be secured via bolts or screws or the like to the platform and includes inner metallic reinforcements. This metal reinforcement (not shown in FIG. 5) extends from a rigid end of the bend stiffener towards the unconstrained end and ends in a circular torus. The location of the torus defines an end of the "steel work" of the bend stiffener.

The body 575 of the bend stiffener is a polymeric material which surrounds and is reinforced by the steel work (not shown) at the rigid end of the bend stiffener and thus effectively provides a rigid structure which is secured to the platform. Aptly the body of the bend stiffener is manufactured from a polyurethane compound or the like. The polymeric body extends away from the rigid end of the bend stiffener past the point in the axial direction where the torus defines an end of the steel work and extends towards the unconstrained end of the bend stiffener. An inner bore of the bend stiffener 540 is defined by a substantially cylindrical inner surface 580. The outer surface of the outer sheath 108 of the flexible pipe body is a substantially cylindrical outer surface which is spaced apart from the inner surface 580 that defines the bore through the bend stiffener. The cylindrical inner surface 580 provided by the bend stiffener extends from the rigid end fitting to the unconstrained end of the bend stiffener. A wear tape 585 is wrapped around the outer surface of the outer sheath 108. Aptly the wear tape is a polyamide or polypropylene or polyethylene based material. Aptly the wear tape is an elastomeric tape or heat shrinkable tape such as Canusa tape or the like. Aptly the wear tape is a thermoplastic composite. The wear tape 585 is wrapped helically and is wrapped having different thicknesses along the length of the outer sheath 108 covered by the bend stiffener. As illustrated in FIG. 5 the wrapping is narrower towards an end of the wrapping proximate to the rigid end of the bend stiffener. By contrast the wrapping has more wraps and thus provides a greater thickness around the unconstrained end of the bend stiffener. As a result an outer surface 587 provided by the wrapped tape provides an outer surface on the flexible pipe. This thus provides a tapered gap 588 located between an inner surface of the bend stiffener which acts as a bending guide member and an outer surface on the flexible pipe (in this example provided by an outer surface of the wrappings of wear tape). The tapered gap 588 is provided in a portion of the region of the flexible pipe which is covered by the bend stiffener. The tapered gap 588 is tapered so as to narrow towards the unconstrained end of the bend stiffener. That is to say the gap is wider towards a rigid end of the bend stiffener than towards an unconstrained end of the bending guide member. The provision of a tapered gap helps increase an effective contact area between an inner surface of the bend stiffener and the outer surface on the flexible pipe when the bend stiffener and flexible pipe bend. This helps avoid contact concentration.

It will be appreciated that whilst FIG. 5 illustrates the creation of a tapered gap using a substantially cylindrical inner bore of a bend stiffener and tapered winding of wear tape the tapered gap could equally be created by a combination of a tapered inner bore region of the bend stiffener and some winding of wear tape.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:
1. An arrangement for limiting contact pressure between a flexible pipe and a bending guide member, the arrangement comprising:
the flexible pipe and the bending guide member comprising a polymeric body extending over a covered region of the flexible pipe in which the flexible pipe can bend, the polymeric body having an outer wall which is tapered from a rigid region of the bending guide member towards an unconstrained end of the bending guide member such that the thickness of the outer wall decreases towards the unconstrained end thereby providing an increase in the degree of flexibility of the bending guide member towards the unconstrained end of the bending guide member; wherein
a gap is provided between an inner surface of the bending guide member and an outer surface on the flexible pipe in at least a portion of said covered region, and wherein said gap is tapered and narrows towards the unconstrained end of the bending guide member.

2. The arrangement as claimed in claim 1, further comprising:
the tapered gap provides an increased effective contact area between the inner surface of the bending guide member and the outer surface on the flexible pipe.

3. The arrangement as claimed in claim 1, further comprising:
the tapered gap is located between a rigid region of the bending guide member and the unconstrained end of the bending guide member.

4. The arrangement as claimed in claim 1 wherein the outer surface of at least a part of said at least a portion of the covered region is a surface of revolution created by rotating a curve around a central axis of the flexible pipe in an unbent state.

5. The arrangement as claimed in claim 1 wherein the tapered gap is located at an axial location along the covered region of the flexible pipe at a position of peak bending curvature.

6. The arrangement as claimed in claim 1, further comprising:
the outer surface on the flexible pipe and/or an inner surface of a channel extending through the bending guide member comprises a tapered region.

7. The arrangement as claimed in claim 1 wherein the outer surface on the flexible pipe comprises a region of an outer sheath of the flexible pipe wrapped in tape.

8. The arrangement as claimed in claim 7, further comprising:
the tape is wrapped around the outer sheath to a greater thickness towards a flexible end of the bending guide member wherein an outer tape surface of the tape windings is tapered and provides the outer surface on the flexible pipe.

9. The arrangement as claimed in claim 1, further comprising:
said bending guide member is a bend stiffener and a wide end of the tapered gap starts to taper towards a narrow end of the tapered gap at an axial location along the covered region proximate to an axial location of a termination point of internal metallic elements of the bend stiffener.

10. The arrangement as claimed in claim 9 wherein said an axial location comprises a lowest point of steel work of the bend stiffener.

11. The arrangement as claimed in claim 10 wherein said lowest point of steel work comprises a lowest point of a torus ring of the bend stiffener.

12. The arrangement as claimed in claim 1 wherein said bending guide member is a bend stiffener and the inner surface of the bend stiffener provides a bore that comprises:
a first substantially cylindrical region having a first diameter proximate to a rigid end of the bend stiffener; and
a tapered region extending from the first substantially cylindrical region towards an unconstrained end of the bend stiffener.

13. The arrangement as claimed in claim 12 wherein the tapered region extends to an end of the bore at the flexible end of the bend stiffener.

14. The arrangement as claimed in claim 12 wherein the tapered region extends to a further substantially cylindrical region having a further diameter that extends towards an end of the bore at the flexible end of the bend stiffener.

15. A method for limiting contact pressure between a flexible pipe and a bending guide member, comprising the steps of:
    locating the bending guide member comprising a polymeric body over the flexible pipe to provide a covered region of the flexible pipe where the flexible pipe can bend, the polymeric body having an outer wall which is tapered from a rigid region of the bending guide member towards an unconstrained end of the bending guide member such that the thickness of the outer wall decreases towards the unconstrained end thereby providing an increase in the degree of flexibility of the bending guide member towards the unconstrained end of the bending guide member; thereby
    providing a tapered gap that narrows towards the unconstrained end of the bending guide member, between an inner surface of the bending guide member and an outer surface on the flexible pipe in at least a portion of the covered region.

16. The method as claimed in claim 15, further comprising:
    providing the tapered gap at an axial location along the covered region at a position of peak bending curvature.

17. The method as claimed in claim 15, further comprising:
    providing the tapered gap by wrapping tape around an outer sheath of the flexible pipe.

18. The method as claimed in claim 17, further comprising:
    wrapping the tape to a tapered thickness around the outer sheath.

19. An arrangement for limiting contact pressure between a flexible elongate member and a bending guide member, the arrangement comprising:
    the flexible elongate member and the bending guide member comprising a polymeric body extending over a covered region of the flexible elongate member where the flexible elongate member bends, the polymeric body having an outer wall which is tapered from a rigid region of the bending guide member towards an unconstrained end of the bending guide member such that the thickness of the outer wall decreases towards the unconstrained end thereby providing an increase in the degree of flexibility of the bending guide member towards the unconstrained end of the bending guide member; wherein
    a gap is provided between an inner surface of the bending guide member and an outer surface of the flexible elongate member in at least a portion of said covered region, and wherein said gap is tapered and has a narrow end most proximate to the unconstrained end of the bending guide member.

20. The arrangement as claimed in claim 19 wherein the flexible elongate member comprises a flexible pipe or a table or an umbilical or a mooring line or the like.

* * * * *